(12) United States Patent
Hattori (10) Patent No.: US 7,580,062 B2
(45) Date of Patent: Aug. 25, 2009

(54) IMAGE CAPTURING SYSTEM, IMAGE CAPTURING METHOD, AND RECORDING MEDIUM, PROGRAM, AND DISPLAY METHOD USED THEREWITH

(75) Inventor: Mitsuaki Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 11/000,247

(22) Filed: Nov. 29, 2004

(65) Prior Publication Data

US 2005/0122410 A1    Jun. 9, 2005

(30) Foreign Application Priority Data

Dec. 4, 2003    (JP)    ............................. 2003-405976

(51) Int. Cl.
*H04N 5/76* (2006.01)

(52) U.S. Cl. .................................. 348/231.2

(58) Field of Classification Search ............... 348/231.2
See application file for complete search history.

(56) References Cited

U.S. PATENT DOCUMENTS

| | | | |
|---|---|---|---|
| 5,915,075 A | 6/1999 | Kadowaki | |
| 6,078,936 A * | 6/2000 | Martin et al. | 715/527 |
| 7,301,566 B2 * | 11/2007 | Nakami et al. | 348/222.1 |
| 2005/0141848 A1 * | 6/2005 | Deguchi et al. | 386/1 |

FOREIGN PATENT DOCUMENTS

JP    06-268856 A1    9/1994

OTHER PUBLICATIONS

Japan Electronic Industry Development Association Standard "Design Rule for Camera File System" Version 1.0, Dec. 1998.

* cited by examiner

*Primary Examiner*—David L Ometz
*Assistant Examiner*—Dillon Durnford-Geszvain
(74) *Attorney, Agent, or Firm*—Canon U.S.A. Inc., I.P. Division (57) ABSTRACT

In an image capturing system, such as a digital still camera, different types of color spaces are set, and, in response to one image-capturing instruction from a user, identification information identifying different types of color spaces is stored in a form associated with the image data, which is automatically input. Based on the identification information for the image data, the image data is displayed for each type of color space.

24 Claims, 10 Drawing Sheets

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

FIG. 10 sRGB s0001.jpg    s0002.jpg

Adobe RGB adobe0001.jpg    adobe0002.jpg

IMAGE CAPTURING SYSTEM, IMAGE CAPTURING METHOD, AND RECORDING MEDIUM, PROGRAM, AND DISPLAY METHOD USED THEREWITH

BACKGROUND OF THE INVENTION

1. Field of the Invention

The present invention relates to an image capturing system such as a digital still camera capable of changing the color space of an output image, and an image capturing method, recording medium and program.

2. Description of the Related Art

A user wishing to utilize an image capturing system such as a digital still camera first selects a desired color space prior to capturing an image. Examples of color spaces that may be selected are sRGB or Adobe RGB.

After image capturing, the color space of the captured image data may be changed by using personal computer application software such as photo-retouching software. This procedure is often time consuming and inconvenient for the user.

Digital still cameras include a feature known as "auto bracketing (capturing)." In auto bracketing, a corrected white balance value and an exposure value are set prior to image capture when the shutter-release button is pressed. The image data obtained by using the set values is gradually shifted.

As noted, personal computer application software is employed to change color spaces after image capture. When captured saturated color data of a high chroma subject in a narrow color space such as sRGB is converted to a broader color space such as Adobe RGB, the saturated colors cannot be accurately represented. Alternatively, a color-space selecting menu of the digital still camera can be used to change a set color space prior to image capture. However, the image capturing must be performed for each color space.

Moreover, when tones of image data are changed (by using computer application software), although a tone can be changed within the same color space, it is difficult to map the tone to another color space outside the defined color space, which causes the color reproduction to deteriorate and also causes color control problems.

SUMMARY OF THE INVENTION

Among other advantages, the image capture system of the present invention performs color-space-bracketing capturing which outputs an image in a different color space for a single image capture.

Another advantage is that the image capture system is capable of preventing image deterioration caused by performing image re-processing a plural number of times and which easily outputs high-quality data of captured images in different types of color spaces.

According to an aspect of the present invention, an image capturing system is provided which includes an image-capturing instruction unit capable of initiating image capture by instruction in response to a user input, an image input unit which inputs image data, a color-space setting unit which sets information of plural different types of color spaces, and a storage unit which receives the image data input by the image input unit in response to one image-capturing instruction from the image-capturing instruction unit, and which automatically stores the input image data in a form associated with the information of the plural different types of color spaces set by the color-space setting unit.

According to another aspect of the present invention, an image capturing method is provided which includes an image-capturing instruction step of instructing the image capturing method to perform image capturing in response to an operation by a user, an image input step of inputting image data, a color-space setting step of setting information of different types of color spaces, and a storage step of receiving the image data input in the image input step in response to one image-capturing instruction in the image-capturing instruction step, and automatically storing the input image data in a form associated with the information of different types of color spaces set in the color-space setting step.

According to another aspect of the present invention, a computer-readable storage medium storing the image capturing method is provided.

According to another aspect of the present invention, a computer program for allowing a computer to execute the image capturing method is provided.

According to another aspect of the present invention, a display method for displaying processed image data output from an image capturing system is provided. The image capturing system includes an image input unit for inputting image data, a color-space setting unit for setting information of different types of color spaces, a storage unit for receiving the image data input by the image input unit, and for automatically storing the input image data in a form associated with the information of different types of color spaces set by the color-space setting unit, and an image processing unit for performing image processing on the image data based on the information of different types of color spaces set by the color-space setting unit. Based on identification information added to the image data, the image data is displayed for each of the different types of color spaces.

According to the present invention, color-space-bracketing capturing in which, in response to one image-capturing instruction, images in different types of color spaces are stored can be performed. Thus, images in different types of color spaces can be easily obtained. In addition, from the images in the different types of color spaces, an image in a desired color space can be selected. This can avoid image re-processing and image re-capturing.

According to a display method of the present invention, a user can easily compare and confirm images of the same scene in different types of color spaces.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention are described below in detail in accordance with the accompanying drawings. The present invention is not limited to the embodiments.

Figure 1:
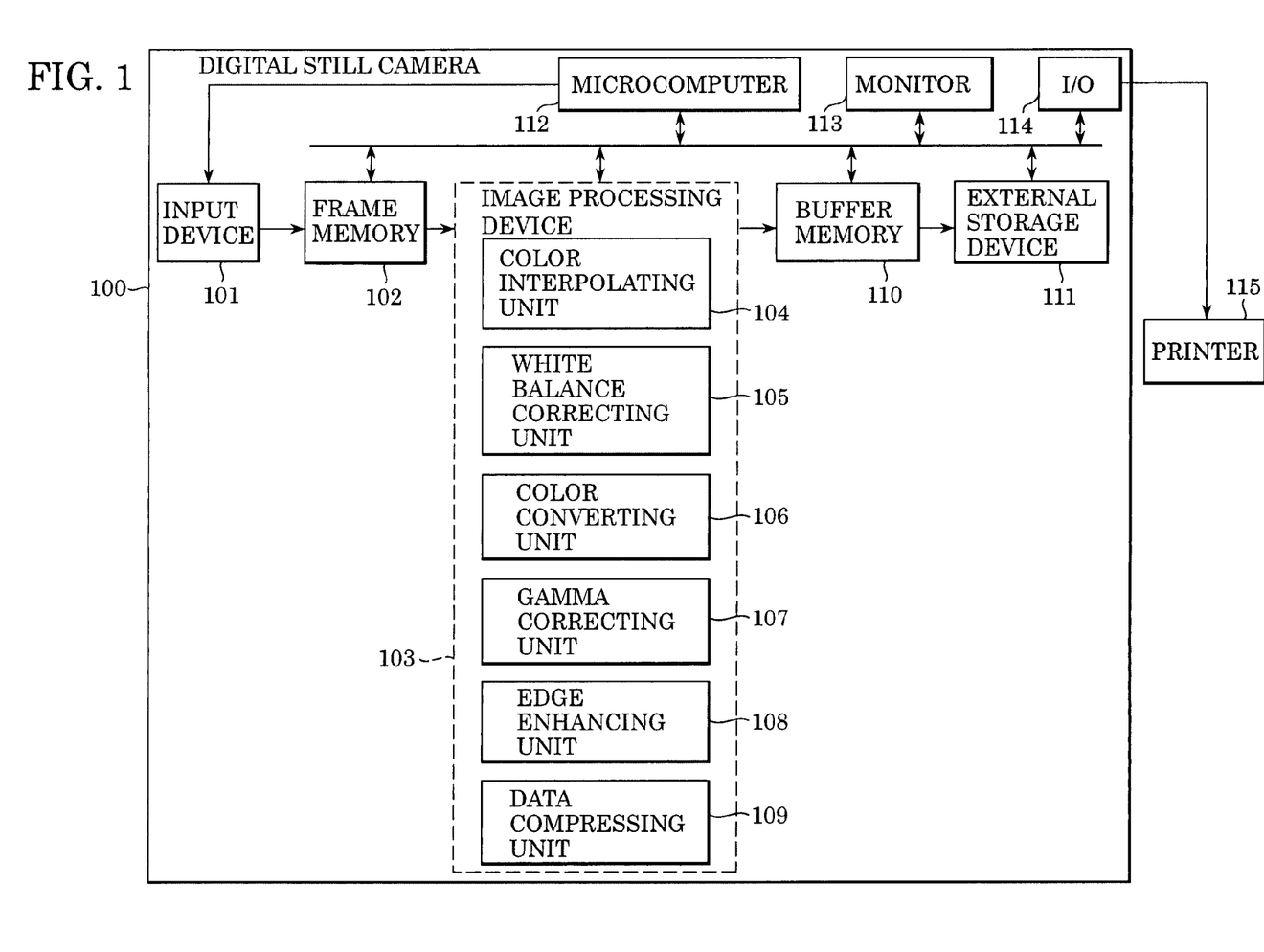
FIG. 1 is a block diagram showing the system configuration of a digital still camera according to an embodiment of the present invention.

FIG. 1 is a block diagram showing the system configuration of a digital still camera 100 serving as an image capturing system according to an embodiment of the present invention. The image capturing system may be separate or integrated into a single system.

The digital still camera 100 includes a microcomputer 112 for controlling the entire system. The microcomputer 112 connects to an input device 101 serving as an image input unit, a frame memory 102, an image processing device 103, a buffer memory 110, and an external storage device 111.

Although not shown, the input device 101 includes a lens unit, an image capturing device such as CCD (charge-coupled device) or CMOS (complementary metal-oxide semiconductor), a timing generator (control signal generator) for driving the image capturing device, an analog-to-digital (A/D) converter for converting an electrical signal output from the image capturing device into digital data.

The frame memory 102 is an image memory for storing the digital data obtained by the A/D converter. The buffer memory 110 is used to store captured-image data processed by the image processing device 103.

The image processing device 103, which performs image processing on the digital data stored in the frame memory 102, includes a color interpolating unit 104, a white balance correcting unit 105, a color converting unit 106, a gamma correcting unit 107, an edge enhancing unit 108, and a data compressing unit 109, which are described later.

Although not shown, the microcomputer 112 includes a central processing unit (CPU) for executing predetermined control (image capturing, recording, playback, etc.) based on a control program, a read-only memory (ROM) storing the control program, and a random access memory (RAM) for use as a work area. The external storage device 111 is used to store the data stored in the buffer memory 110. A compact flash (CF) card, a SmartMedia, a secure digital (SD) memory card, or the like, may be used as the external storage device 111. A monitor 113 is used to view images for capture and to playback captured images. An input/output (I/O) port 114 is used for inputting/outputting data to/from an external device such as a printer 115 and a display. The printer 115 is connected to the digital still camera 100 through the I/O port 114. The printer 115 prints images captured by the digital still camera 100, which are output through the I/O port 114.

The processing units of the image processing device 103 will now be described.

Figure 2:
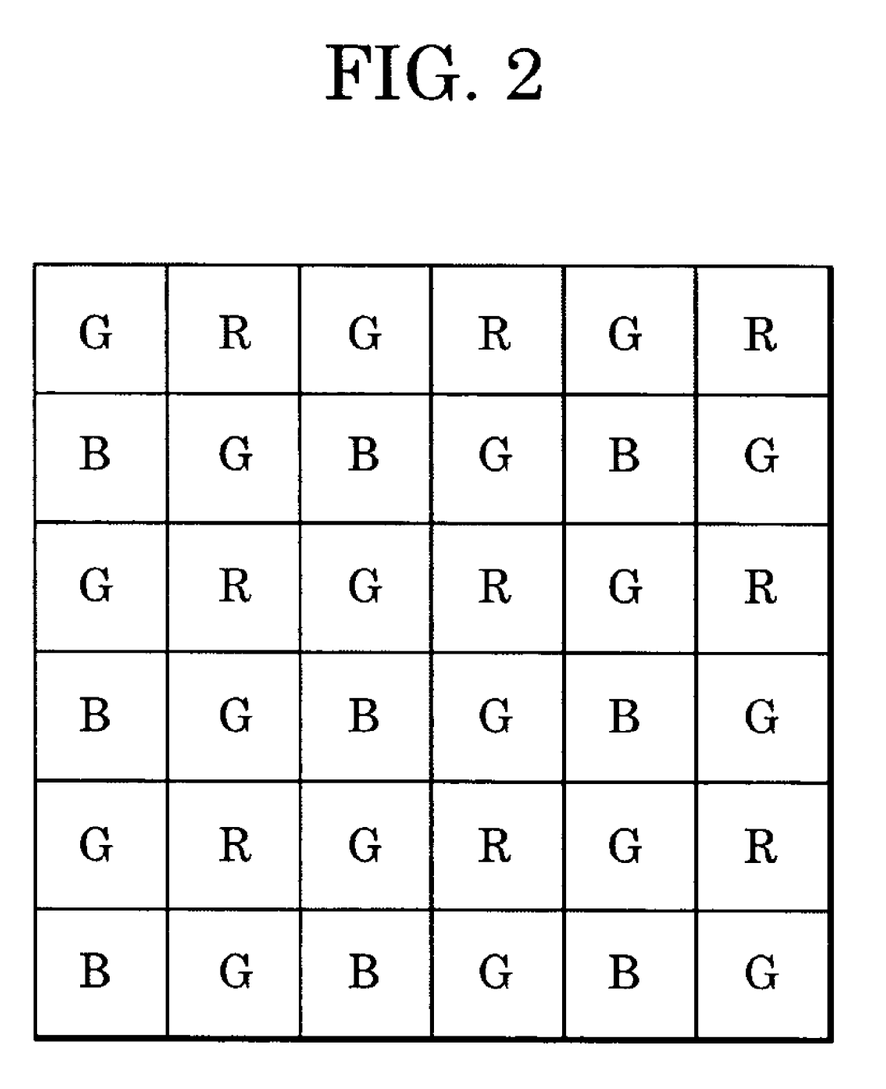
FIG. 2 is Bayer array for use as a color filter in an image capturing device according to an embodiment of the present invention.

The image pick up device of input device 101 employs a color filter system known as the primary-color Bayer array as shown in FIG. 2. In FIG. 2, the Bayer array is patterned such that each pixel has an R, G, or B color value. To obtain other color values for each pixel, an interpolation process is performed by the color interpolating unit 104 by using nearby pixels having the desired color value. For example, a G value can be obtained for a B pixel by interpolating G pixels around the B pixel.

By using a predetermined white-balance correcting coefficient designated by the microcomputer 112, the white balance correcting unit 105 performs white-balance correction processing on the color-interpolated image data.

The color converting unit 106 uses a predetermined color-conversion coefficient to correct the chroma, luminance, hue, etc., of the white-balance-corrected image data. The color-conversion coefficient for use in conversion differs for each color space. By changing the color-conversion coefficient, images for various color spaces are created.

The gamma correcting unit 107 performs gamma correction by using a predetermined gamma-correction coefficient designated by the microcomputer 112. This corrects image tone.

The edge enhancing unit 108 changes the intensity of an image edge by using a predetermined edge-enhancing coefficient (aperture coefficient) designated by the microcomputer 112.

The data compressing unit 109 uses, for example, a JPEG (Joint Photographic Experts Group) method, to compress the above-processed image processed at a predetermined compression ratio designated by the microcomputer 112.

Although not shown, the digital still camera 100 also has a release button for an image-capturing instruction unit, an operating unit including buttons and dials for externally setting various conditions, and a display unit for displaying an image or the like. Various image processing coefficients for use in the image processing device 103, such as the white balance correction coefficient, the color conversion coefficient, the gamma correction coefficient, the edge enhancement coefficient, and the JPEG compression ratio, can be externally changed by using the operating unit.

Although many different embodiments are contemplated, six embodiments are discussed below. It is noted that these six embodiments are not exhaustive but are rather exemplary. Since the embodiments have the above-described configuration in common, a description thereof is omitted.

First Embodiment

A first embodiment of the present invention is a color-space bracketing-capturing mode in which in response to a single operation of the image-capturing instruction unit, two image input (capturing) actions are automatically performed. Images in different color spaces (sRGB and Adobe RGB) are formed and are sequentially output for each single image capture. In this mode, an operation in which the images are output to the external storage device 111, with directories or folders divided for color spaces, is described below.

It is noted that the first embodiment can output images in two or more color spaces.

Figure 3:
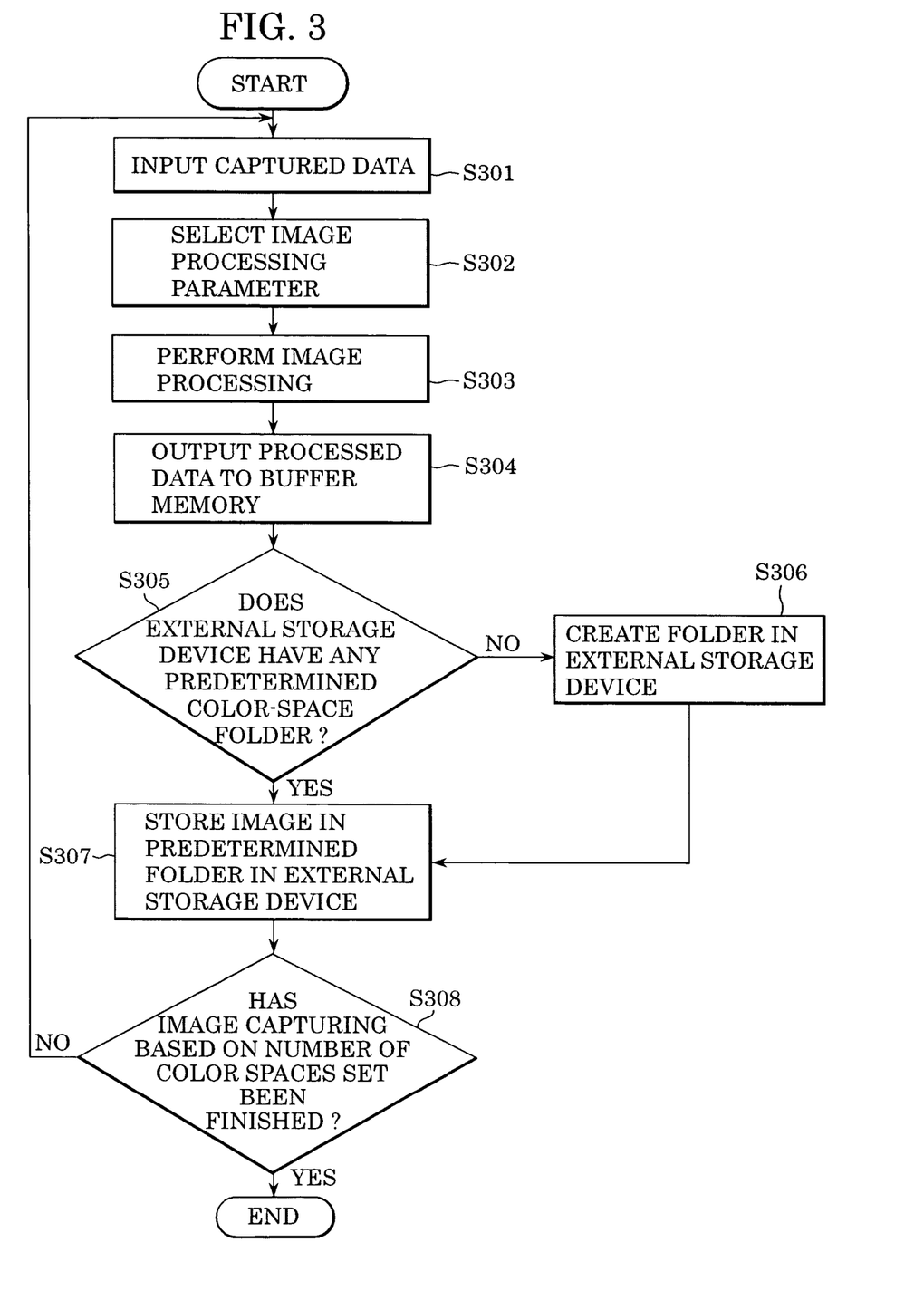
FIG. 3 is a flowchart showing the digital still camera according to a first embodiment of the present invention.

FIG. 3 is a flowchart showing an operation of the digital still camera 100 according to the first embodiment of the present invention. This operation is described below with reference to the flowchart in FIG. 3.

Figure 9:
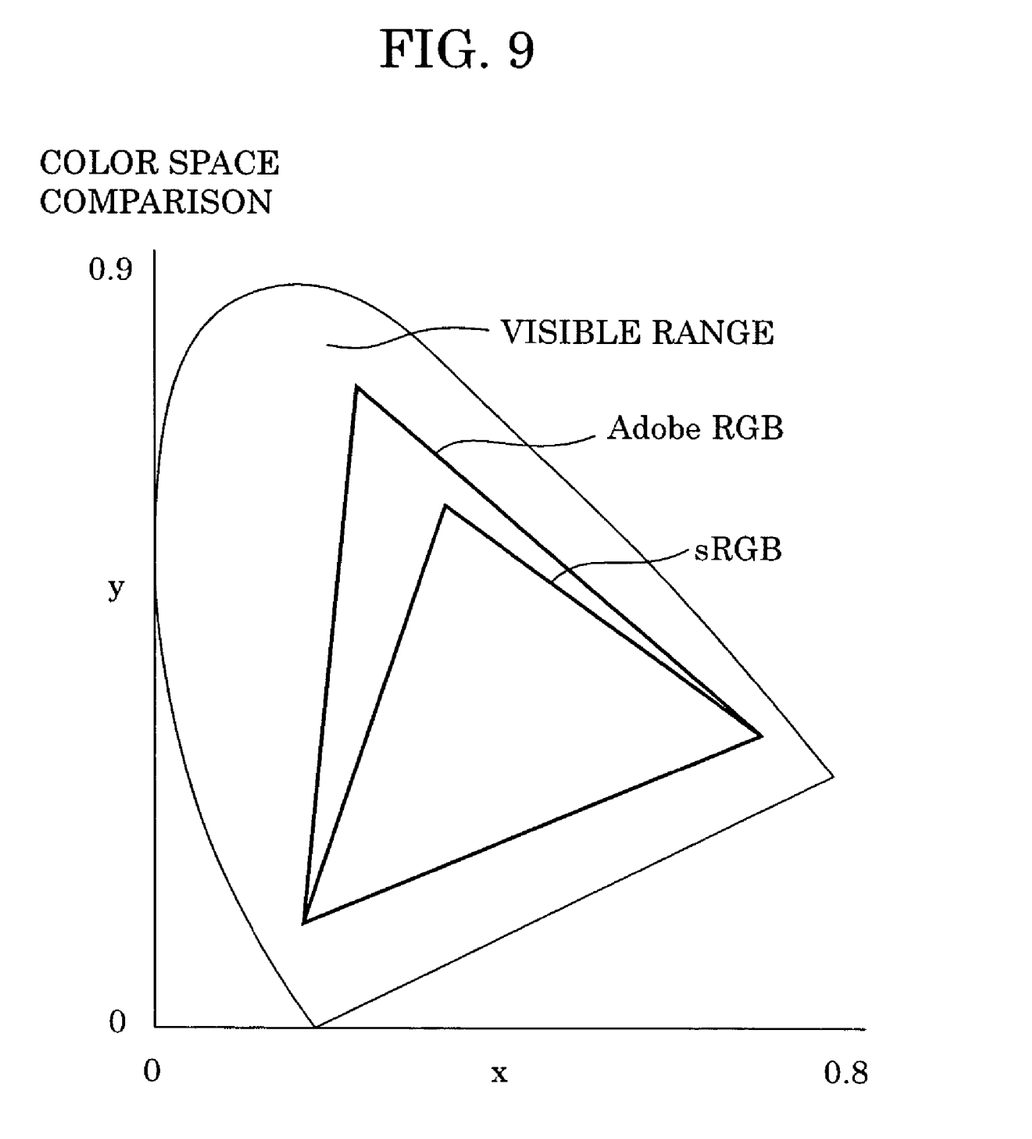
FIG. 9 is a graph showing examples of color spaces.

The user wishing to perform image capturing begins by selecting two or more color spaces for images to be output. The user may select sRGB and Adobe RGB, for example. In this case, image processing for the selected types of color spaces and processed images are output in image-capturing order. For example, the first frame of a captured image is output based on sRGB, and the second frame of the captured image is output based on Adobe RGB. Both frames are treated as one set. Generally, all of the frames, each from a color space type, are treated as a set. For example, if three color spaces are selected, the three frames are treated as a set. By automatically repeating this set while changing the color space types, image capturing is performed. Regarding color space setting, in response to setting of one type of color space, two or more types of color spaces which are close to the set color space may be automatically set. For example, in response to setting of an sRGB space, bracketing capturing can be performed using different regions of captured image color spaces which are set so that an Adobe RGB space larger than the sRGB space, as shown in FIG. 9, can be automatically set.

In step S301, after the above condition is set, by pressing the release button for instructing the digital still camera 100 to perform image capturing, first-frame image capturing is initiated and captured image data is input from the input device 101. Specifically, image capturing is performed by using the image-capturing device, such as a CCD, to photoelectrically convert a focused image of a subject through the lens unit, and outputting the obtained electrical signal as image data to the frame memory 102 through the A/D converter.

In step S302, the microcomputer 112 instructs the image processing device 103 to perform image forming based on an image processing parameter (color conversion coefficient) for the sRGB color space between the selected sRGB and Adobe RGB color spaces.

In step S303, after performing color interpolation and white balance correction, the image processing device 103 performs color conversion using the color conversion coefficient for sRGB in response to the instruction by the microcomputer 112. Subsequently, the image processing device 103 performs gamma correction and edge enhancement, and compresses the image in accordance with JPEG or the like.

In step S304, sRGB color-space information and bracketing-capturing-number information are added to a header portion of a file of the compressed image, and the information-added file is output to the buffer memory 110. Here, "1" is input as the bracketing-capturing-number information since the compressed image is the first bracketed image. When no bracketing capturing is performed, "0" is input as the bracketing-capturing-number information.

In step S305, when the external storage device 111 has no "sRGB" directory or folder, a directory or folder named "sRGB" is created in step S306, and the sRGB image is recorded in the created directory or folder in step S307.

In step S305, when the external storage device 111 already has an "sRGB" directory or folder, the sRGB image is recorded in the "sRGB" directory or folder in step S307.

Although the name of the directory or folder is "sRGB", it is not limited thereto. However, file names are assigned so that files in a directory or folder in the same color space do not have any identical file names.

Between the two set color spaces (sRGB and Adobe RGB), recording for sRGB was performed. Next, steps S301 to S307 are repeated based on the number of color spaces that is set (step S308).

Since the second frame is set to correspond to Adobe RGB, as described above, processing therefor is similarly described below.

In step S301, image capturing of the second frame is performed and image data is input from the input device 101 again.

In step S302, the microcomputer 112 instructs the image processing device 103 to perform image forming processing based on an image processing parameter (color conversion coefficient) for the Adobe RGB color space between the selected sRGB and Adobe RGB color spaces.

In step S303, after performing color interpolation and white balance correction, the image processing device 103 performs color conversion using the color conversion coefficient for Adobe RGB in response to the instruction by the microcomputer 112. Subsequently, the image processing device 103 performs gamma correction and edge enhancement, and compresses the image in accordance with JPEG or the like.

In step S304, Adobe RGB color-space information and bracketing-capturing-number information are added to a header portion of a file of the compressed image, and the information-added file is output to the buffer memory 110. Here, "2" is input as the bracketing-capturing-number information since the compressed image is the second bracketed image.

In step S305, when the external storage device 111 has no "Adobe RGB" directory or folder, a directory or folder named "Adobe RGB" is created in step S306, and the Adobe RGB image is recorded in the created directory or folder in step S307.

In step S305, when the external storage device 111 already has an "Adobe RGB" directory or folder, the sRGB image is recorded in the "Adobe RGB" directory or folder in step S307.

Although the name of the directory or folder is "Adobe RGB", it is not limited thereto. However, file names are assigned so that files in a directory or folder in the same color space do not have any identical file names.

At this point the two frames, which correspond to the two color spaces set beforehand have been output. Image capturing for one set of sRGB and Adobe RGB frames in color-space bracketing capturing is complete.

Thus, for bracketing capturing two types of color spaces, with the color spaces treated as a single set, when the shutter is released, automatic image capturing for the two frames is performed and completed for the single set. This is also the case for three or more color spaces wherein the obtained frames are treated as a single set.

According to the first embodiment, by storing output image files in directories or folders different for color spaces, later management of images is facilitated.

Second Embodiment

The second embodiment of the present invention is directed to a color-space bracketing-capturing mode in which, in response to a single operation of the image-capturing instruction unit, two image input (capturing) actions are performed and images in different color spaces (sRGB and Adobe RGB, for example) for each image-capturing time are sequentially output. In this mode, an operation in which the images are output to the external storage device 111, with file names changed for color spaces, is described below.

Figure 4:
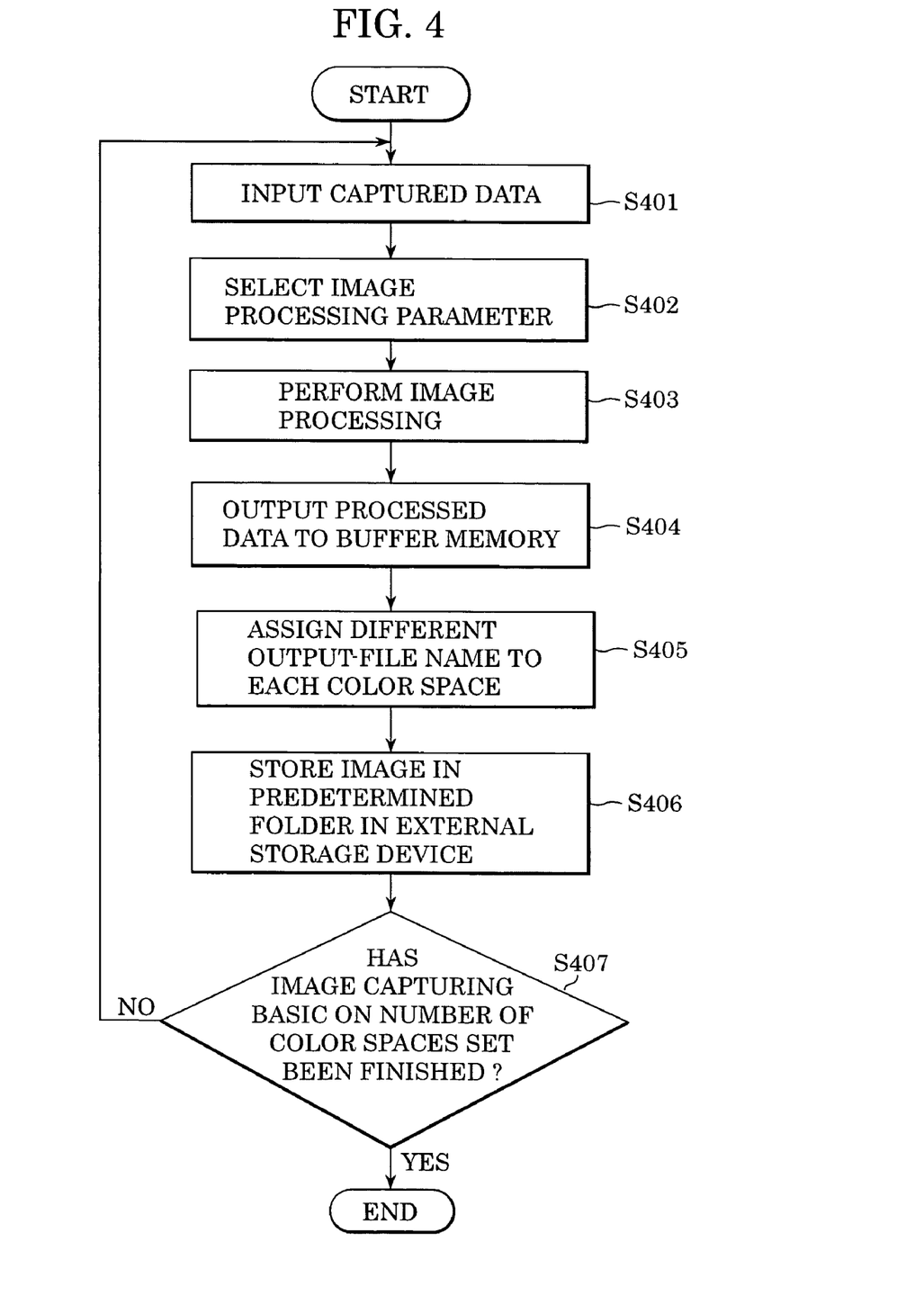
FIG. 4 is a flowchart showing the operation of the digital still camera according to a second embodiment of the present invention.

FIG. 4 is a flowchart showing an operation of the digital still camera 100 according to the second embodiment of the present invention.

In steps S401 to S404, input image data is controlled to change into initially color space information similarly to the steps S301 to S304 of FIG. 3, and sRGB color-space information and bracketing-capturing-number information are added to the processed data. The information-added data is output to the buffer memory 110. Here, "1" is input as the bracketing-capturing-number information since the processed data corresponds to the first bracketed image. When no bracketing capturing is performed, "0" is input as the bracketing-capturing-number information.

In step S405, before the sRGB image recorded in the buffer memory 110 is recorded in the external storage device 111, "s0000.jpg" is assigned as the name of a file of the sRGB image. Although, in the second embodiment, each file name includes "s", it is not limited thereto if it is different for each color space. In step S406, finally, the named image is recorded in the external storage device 111.

At this point, between the two color spaces (sRGB and Adobe RGB) previously set for bracketing capturing, sRGB has been recorded. In step S407, steps S401 to S406 are repeatedly performed based on the number of set color spaces.

Next, image capturing of the second frame is similarly described below.

In step S401, image capturing of the second frame is performed and image data is input from the input device 101 again.

In step S402, the microcomputer 112 instructs the image processing device 103 to perform image forming processing based on an image processing parameter (color conversion coefficient) for the Adobe RGB color space between the selected sRGB and Adobe RGB color spaces. The image processing device 103 performs color conversion processing using a color conversion coefficient for Adobe RGB. In step S404, Adobe RGB color-space information and bracketing-capturing-number information are added to a header portion of a file of the processed image, and the information-added file is output to the buffer memory 110. Here, "2" is input as the bracketing-capturing-number information since the processed image is the second bracketed image.

In step S405, before the Adobe RGB image recorded in the buffer memory 110 is recorded in the external storage device 111, "adobe0000.jpg" is assigned as a file name of the Adobe RGB image.

In the second embodiment, the name "Adobe", which represents a color space itself, is used as the file name. However, the file name is not limited to the name "Adobe" if it is different from each color space. In step S406, finally, this image is recorded in the external storage device 111.

In each of the above file names, "0000" represents a file number count and the count is incremented by one whenever data for each color space is stored in the external storage device 111. In the second embodiment, the count is separately managed for each color space in the microcomputer 112. However, the count may be managed without separating color spaces. In this case, in the second embodiment, files named "s0000.jpg" and "adobe0001.jpg" are output.

At this point, images for the color spaces (sRGB and Adobe RGB) previously set for bracketing-capturing have been output. Accordingly, color-space-bracketing capturing for one set of sRGB and Adobe RGB images is complete.

As described above, a different file name for each color space is added to an image file to be output, or a color space is added as an identifiable file name to the image file to be output. Thus, later management of images is facilitated. By way of example, in the case of a file named "IMG_0001.JPG", "IMG" represents a file name and "0001" represents a file number.

Third Embodiment

The third embodiment of the present invention is directed to a color-space bracketing-capturing mode in which, in response to each image-capturing instruction, images in two color spaces (sRGB and Adobe RGB) are sequentially output. In this mode, an operation in which an extension of each image file is changed for each color space before the image file is output to the external storage device 111 is described below.

Figure 5:
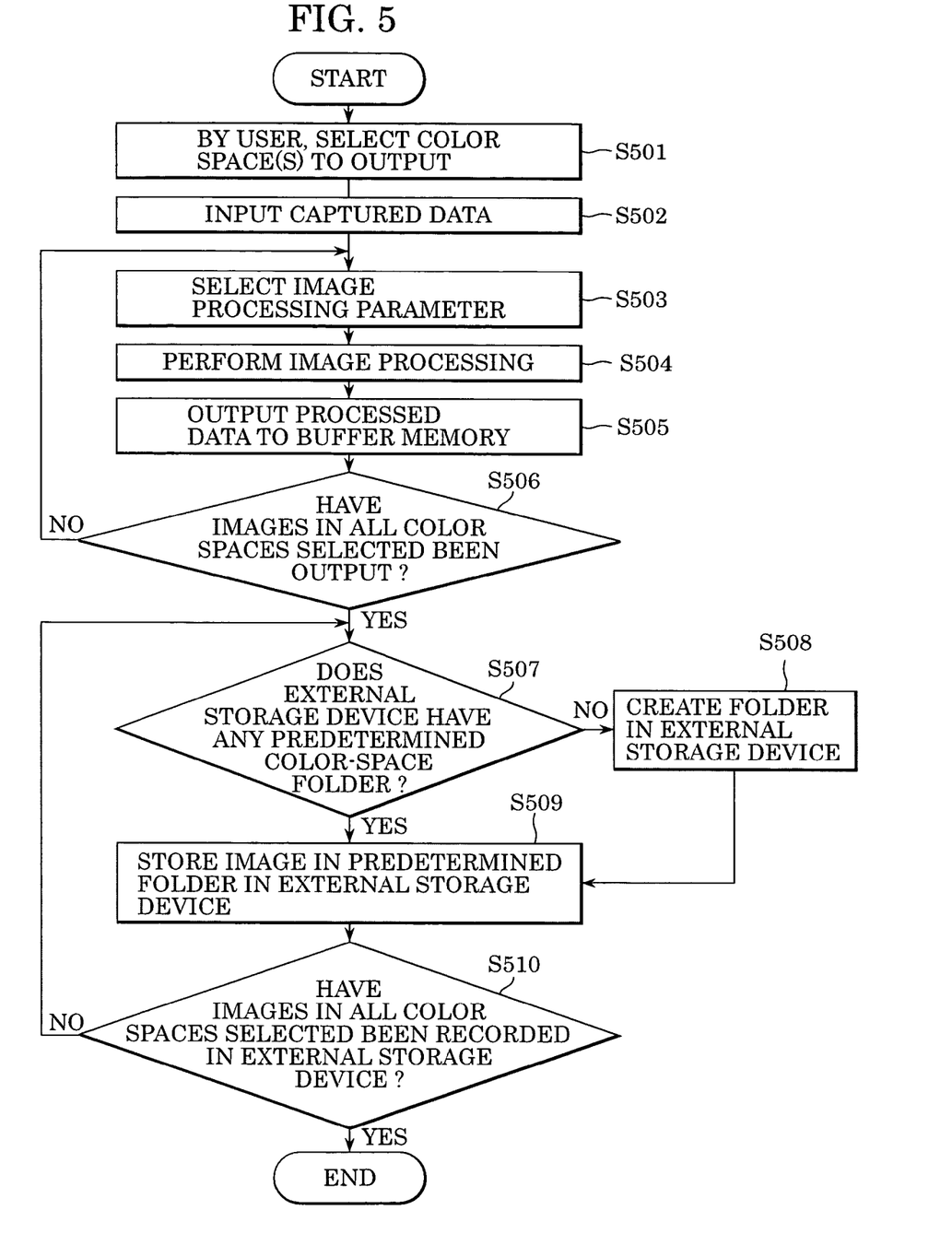
FIG. 5 is a flowchart showing the operation of the digital still camera according to a third embodiment of the present invention.

FIG. 5 is a flowchart-showing an operation of the digital still camera 100 according to the third embodiment of the present invention.

The third embodiment is identical to the first and second embodiments in that the first frame of a captured image is output in sRGB form and the second frame of the captured image is output in Adobe RGB form, both frames constituting one set. A description of steps S501 to S504 is omitted since they are identical to steps S301 to S304. In step S505, before the sRGB image recorded in the buffer memory 110 is recorded in the external storage device 111, "IMG_0000.sjpg" is assigned as a file name of the sRGB image. Although, in the third embodiment, the file extension is named "sjpg", it is not limited thereto if its name differs for each color space. Finally, this image is recorded in the external storage device 111 in step S506.

Subsequently, the second frame is captured and color conversion on the second frame is performed by using a color conversion coefficient for Adobe RGB. Adobe RGB color-space information is added to a header portion of a file of the data of the second frame. The information-added data is output to the buffer memory 110 (step S504).

In step S505, before the Adobe RGB image recorded in the buffer memory 110 is recorded in the external storage device 111, "IMG_0000.adobejpg" is assigned as a file name of the Adobe RGB image.

Although, in the third embodiment, the file name is "adobe", it is not limited thereto if it is different for each color space. In step S506, finally, this image is recorded in the external storage device 111

In each of the above file names "IMG_0000.sjpg" and "IMG_0000.adobejpg", "0000" represents a file number count and the count is incremented by one whenever data for each color space is stored in the external storage device 111. Although, in the third embodiment, the count is separately managed for each color space in the microcomputer 112, it may be managed without separating color spaces. In this case, in the third embodiment, files named "IMG_0000.sjpg" and "IMG_0001.adobejpg" are output.

As described above, an extension which is different for each color space is added to each image file to be output. This facilitates later management of images.

In the first to third embodiments, when the shutter release button is pressed activated by the user, captured image data is automatically input at a predetermined rate, which is equal to the number of color spaces set by the user, and image processing for different color spaces is performed. Accordingly, by using image processing parameters for color spaces different for each image-capturing time, images for different color spaces are output.

In the fourth to sixth embodiments of the present invention, by pressing the release button once, captured image data is input once. After that, for the same captured image data, image processing for different color spaces is performed, whereby images for a plurality of different color spaces are output. The fourth to sixth embodiments of the present invention are described below.

Fourth Embodiment

An operation in which, for a single image capture, images in two types of color spaces (sRGB and Adobe RGB, for example) are output to the external storage device 111, with directories or folders divided for color spaces, are described below.

It is noted that, in the fourth embodiment, images can be output into two, three, or more color spaces and that the color spaces sRGB and Adobe RGB are merely exemplary.

Figure 6:
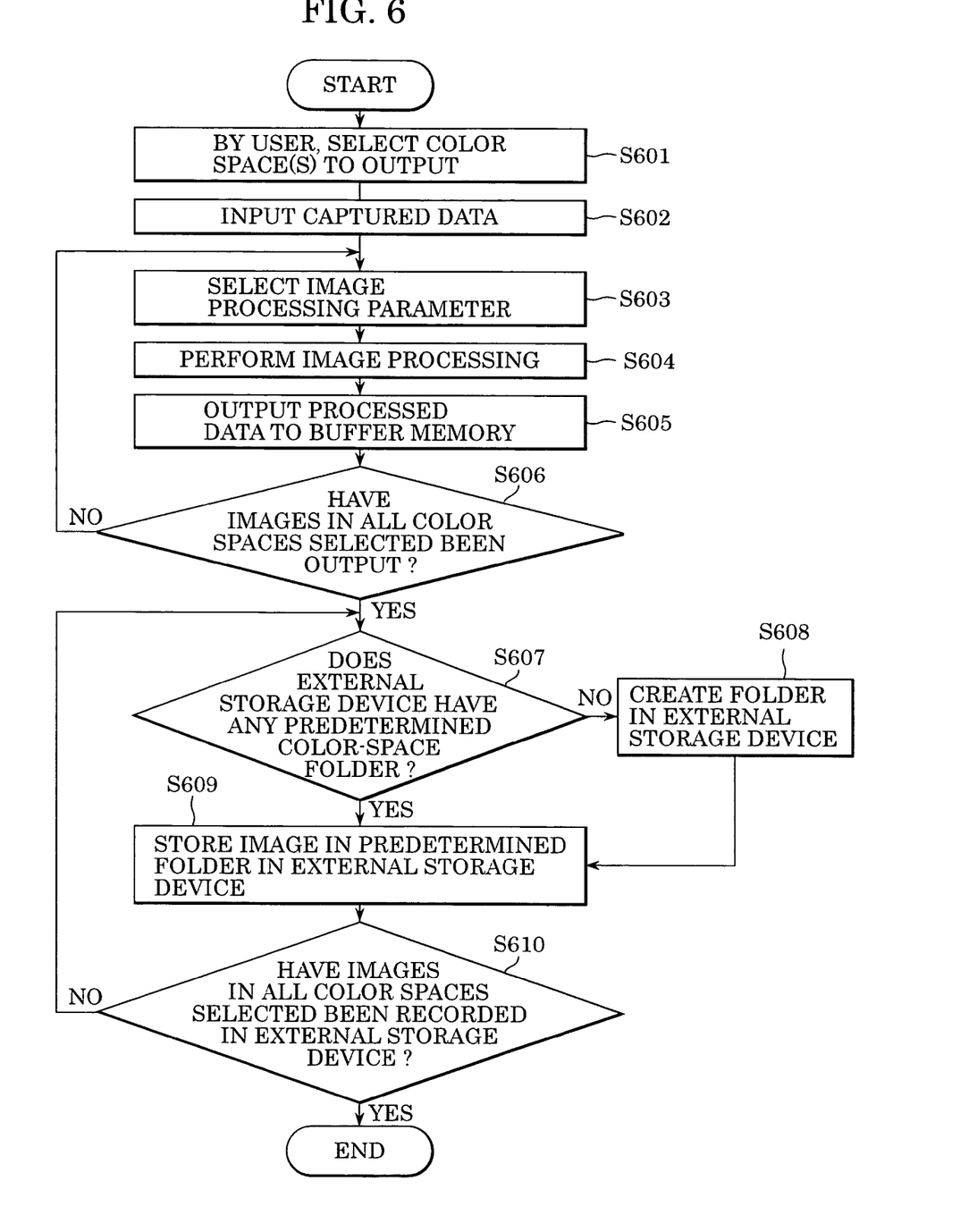
FIG. 6 is a flowchart showing the operation of the digital still camera according to a fourth embodiment of the present invention.

FIG. 6 is a flowchart showing an operation of the digital still camera 100 according to the fourth embodiment of the present invention.

In FIG. 6, step S601, prior to image capture, the user first selects the types of color spaces for image output. For the selection, the images in the selected color spaces are output based on captured image data. In the fourth embodiment, two types of color spaces, sRGB and Adobe RGB, are selected. However, since settings of the once selected color spaces are maintained, the set color spaces do not need to be set for each image-capturing time.

In step S602, the user then presses the release button to instruct the digital still camera 100 to perform image capturing, after which captured image data is input from the input device 101.

Specifically, image capturing is performed by using the image capturing device, such as a CCD, to photoelectrically convert a focused image of a subject through the lens unit, and outputting the obtained electrical signal as image data to the frame memory 102 through the A/D converter.

In step S603, the microcomputer 112 instructs the image processing device 103 to perform image forming processing based on an image processing parameter (color conversion coefficient) for the sRGB color space.

In step S604, after performing color interpolation and white balance correction, the image processing device 103 performs color conversion using the color conversion coefficient for sRGB in response to the instruction by the microcomputer 112. Subsequently, the image processing device 103 performs gamma correction and edge enhancement, and compresses the image in accordance with JPEG or the like.

In step S605, sRGB color-space information is added to a header portion of a file of the compressed image, and the information-added file is output to the buffer memory 110.

In step S606, it is determined whether the images corresponding to all the control signals selected in step S601 have been output. In this stage, the image in the sRGB color space is output and the image in the Adobe RGB is not output. Accordingly, the operation returns to step S603. In step S603, the microcomputer 112 instructs the image processing device 103 to perform image forming processing based on an image processing parameter (color conversion coefficient) for the Adobe RGB color space. In step S604, after performing color interpolation and white balance correction, the image processing device 103 performs color conversion using the color conversion coefficient for Adobe RGB in response to the instruction by the microcomputer 112. Subsequently, the image processing device 103 performs gamma correction and edge enhancement, and compresses the image in accordance with JPEG or the like. In step S605, Adobe RGB color-space information is added to a header portion of a file of the compressed image, and the information-added file is output to the buffer memory 110.

At this time, the images in the two color spaces selected are output. At the present moment, the buffer memory 110 temporarily stores the images in the two color spaces sRGB and Adobe RGB. Accordingly, the operation proceeds to step S607.

In step S607, it is determined whether the external storage device 111 has any sRGB directory or folder.

If in step S607, the external storage device 111 does not have any "sRGB" directory or folder, a directory or folder named "sRGB" is created in step S608, and the image in sRGB is recorded in the created directory or folder.

If, in step S607, the external storage device 111 has an "sRGB" directory or folder, the image in sRGB is recorded in the "sRGB" directory or folder in step S609.

Although the name of the directory or folder is "sRGB", it is not limited to "sRGB". However, files are prevented from having identical names in each type of color space.

In step S610, it is determined whether images in all selected color spaces have been recorded in the external storage device 111. If it has not recorded the images, the operation returns to step S607.

At the present moment, the image in sRGB is recorded and the image in Adobe RGB is not recorded. Accordingly, the operation returns to step S607. When it is found in step S607 that the external storage device 111 does not have any "Adobe RGB" directory or folder, a directory or folder named "Adobe RGB" is created in step S608, and the image is recorded in the created directory or folder in step S609.

If it is found in step S607 that the external storage device 111 already has an "Adobe RGB" directory or folder, the image is recorded in the "Adobe RGB" directory or folder.

Although the directory or folder is named "Adobe RGB", the name is not limited to "Adobe RGB". However, files are prevented from having identical names in each type of color space.

In step S610, it is determined whether images in all selected color spaces have been recorded in the external storage device 111. If the two images in sRGB and Adobe RGB are already recorded in the external storage device Ill in this stage, the operation ends.

As described above, according to the fourth embodiment of the present invention, files of images to be output are stored in a directory or folder different for each type of color space, thus facilitating later management of images.

Fifth Embodiment

Next, an embodiment is discussed, in which, for a single image capture, images in two types of color spaces (sRGB and Adobe RGB, for example) are output to the external storage device 111, with directories or folders changed for color spaces.

Figure 7:
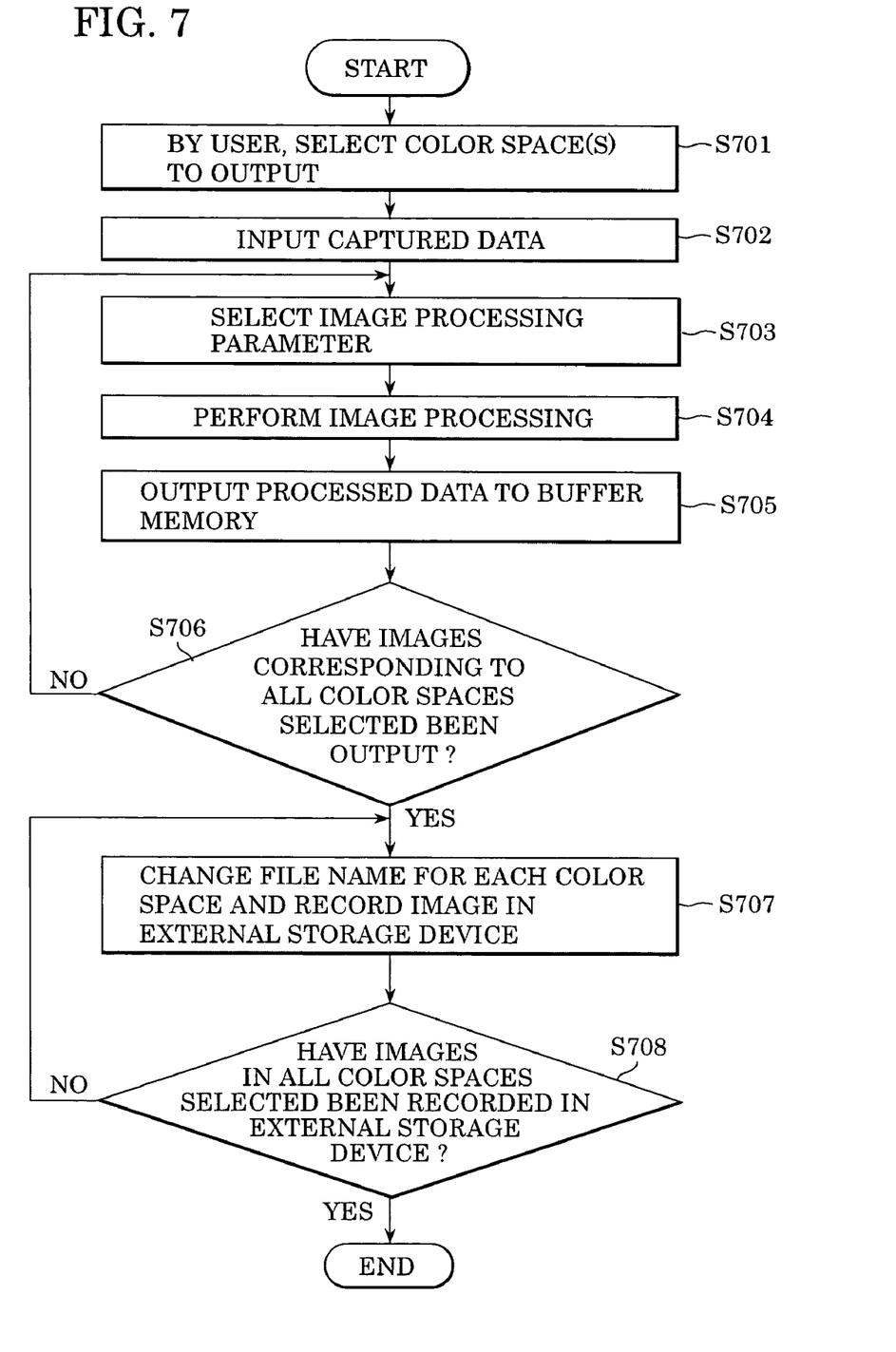
FIG. 7 is a flowchart showing the operation of the digital still camera according to a fifth embodiment of the present invention.

FIG. 7 is a flowchart showing an operation of the digital still camera 100 according to the fifth embodiment of the present invention. A description of steps S701 to S706 is omitted since they are identical to the steps S601 to S606 shown in FIG. 6.

After images in two color spaces selected in step S706 are output, the operation proceeds to step S707.

In step S707, before the sRGB image recorded in the buffer memory 110 is recorded in the external storage device 111, "s0000.jpg" is assigned as a file name of the sRGB image. Although, in the fifth embodiment, the file name is "s", it is not limited thereto if it is different for each color space.

In step S708, it is determined whether the external storage device 111 has recorded the images in the color spaces selected. In the present stage, only the sRGB image is recorded but the Adobe RGB image is not recorded. Accordingly, the operation returns to step S707. After "adobe0000.jpg" is assigned as a file name of the sRGB image recorded in the buffer memory 110, the Adobe RGB image is recorded in the external storage device 111. In the fifth embodiment, the file name is "adobe". However, the file name is not limited thereto if it is different for each type of color space. By adding a color space name, simple viewing of the file name can identify the color space of the image.

In each of the file names "s0000.jpg" and "adobe0000.jpg", "0000" represents a file number count and the count is incremented by one whenever data in each color space is stored in the external storage device 111. In the fifth embodiment, the count is separately managed for each color space in the microcomputer 112. However, the count may be managed without separating the color spaces. In this case, in the fifth embodiment, files named "s0000.jpg" and "adobe0000.jpg" are output.

The images in all the color spaces selected are output ("YES" in step S708). Accordingly, the operation ends.

As described above, a different file name for each type of color space is added to an image file to be output, thus facilitating later management of images.

Sixth Embodiment

Next, an embodiment is discussed, in which, for a single image capture, images in two types of color spaces (sRGB and Adobe RGB, for example) are output to the external storage device 111, with different file extensions set for each color spaces.

Figure 8:
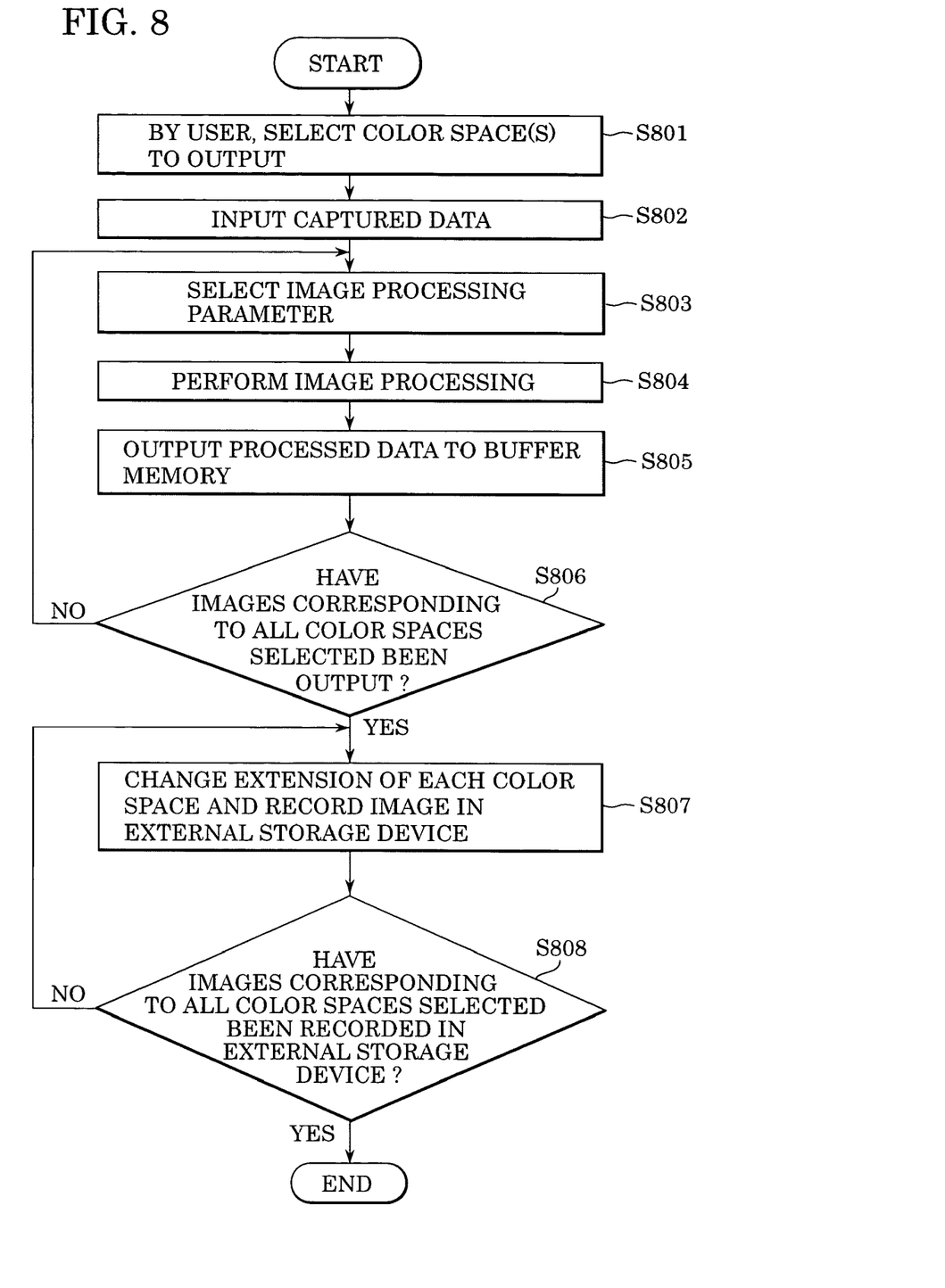
FIG. 8 is a flowchart showing the operation of the digital still camera according to a sixth embodiment of the present invention.

FIG. 8 is a flowchart showing an operation of the digital still camera 100 according to the sixth embodiment of the present invention. A description of steps S801 to S806 is omitted since they are identical to the steps S601 to S606 shown in FIG. 6.

After images in two color spaces selected in step S806 are output, the operation proceeds to step S807.

In step S807, "IMG_0000.sjpg" is assigned as a file extension assigned to the image in sRGB recorded in the buffer memory 110. In the sixth embodiment, the file name is "sjpg". However, the file name is not limited to "sjpg" if it includes a file extension different for each type of color space.

In step S808, it is determined whether the external storage device 111 has recorded the images in all the color spaces selected. At the present stage, only the image in sRGB is recorded but the image in Adobe RGB is not recorded. Accordingly, the operation returns to step S807. "IMG0000.adobejpg" is assigned as a file name assigned to the image in sRGB recorded in the buffer memory 110. In the sixth embodiment, an extension name of "adobejpg" representing a color space is used. However, the extension name is not limited to the color-space representing name if it is different for each type of color space.

In each of the file names "IMG_0000.sjpg" and "IMG_0000.adobejpg", "0000" represents a file number count and the count is incremented by one whenever data in each color space is stored in the external storage device 111. In the sixth embodiment, the count is separately managed for each color space in the microcomputer 112. However, the count may be managed without separating the color spaces. In this case, files named "IMG_0000.sjpg" and "IMG_0001.adobejpg" are output.

Since the images in all the color spaces selected are output ("YES" in step S808), the operation ends.

As described above, a file extension which is different for each type of color space is added to each image file to be output. This facilitates later management of images.

A form in which the digital still camera 100 has only one external storage device 111 as a recording unit has been described. However, in the case of, for example, a multi-slot digital camera having one or more recording units, such as a digital camera having two slots for a CF card and an SD card, by further applying the above embodiments, images may be recorded in recording units different for color spaces, or image recording may be performed with one recording unit selected for each color space. For example, by recording an image file of CMYK data in the CF card and an image file of sRGB data in the SD card, when printing is performed by using a printer in which a memory card can be directly inserted, only the CF card, which stores the CMYK data, needs to be used, thus improving the efficiency of operation.

In the above-described embodiments, regarding a plurality of different types of color spaces, two types of color spaces, sRGB and Adobe RGB, have been described. However, the color spaces are not limited to the two color spaces. For example, various types of color spaces, such as CMYK and $L^*a^*b$ for printing, may be used. Setting of a plurality of color spaces includes a form in which the user can select one of factory-stored image processing types for color spaces, and a form in which image processing types for color spaces are factory-set.

In the above-described embodiments, a form in which, for color spaces set by the user, the digital still camera 100 performs a type of image processing corresponding to each color space and outputs processed data to the external storage device 111 has been described. However, by adding, to a header region of captured image data, user-set color-space information as identification information capable of identifying a color space, and recording the information-added data in the external storage device 111, which includes a removable recording medium, image processing corresponding to each color space of the data may be performed while referring to the information of the header region at playback time. The header region may be added for data of each image. In addition, pieces of identification information capable of identifying different types of color spaces may be recorded in single image data, which is the original.

Figure 10:
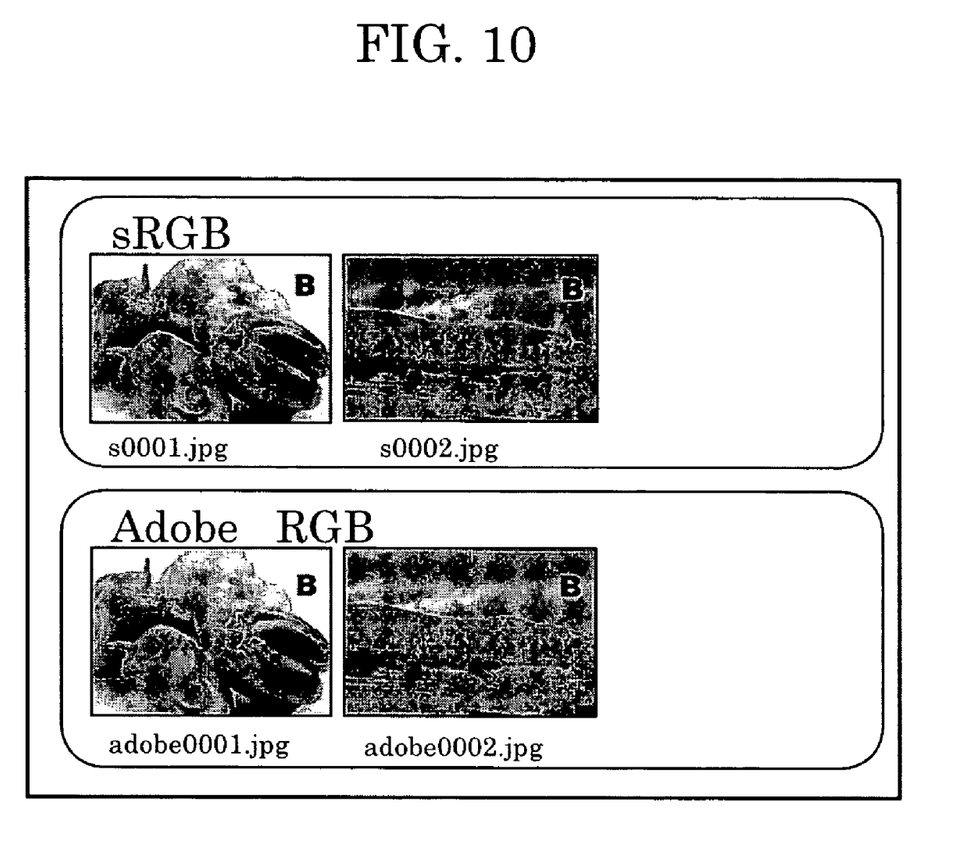
FIG. 10 is an illustration of color-space-bracketing image capturing.

At playback time, as shown in FIG. 10, by displaying, on the monitor 113, each piece of color space information recorded as header information added to images, with image data processed in accordance with image processing for the color space, it can be confirmed which type of color space is used to represent processed image. In addition, when a file extension includes information specifying a color space, after the color space is identified based on the extension, the image may be displayed on the monitor 113 at playback time. At playback time, and at the time of displaying images by personal-computer application software, by detecting bracketed images from information of each color space and bracketing-capturing-number information, which are recorded as header information added to image data, as shown in FIG. 10, images simultaneously bracketed may also be displayed in a multi-screen form on the monitor 113, with header information or color space information recorded in header information. This enables the user to easily compare and confirm images in different color spaces of the same image after performing image capturing. In the case of displaying the bracketed images, marking or icons for color-space-bracketed images, such as the letter "B" shown in FIG. 10, may be added to the bracketed images so that the displayed images can be found as bracketed images in one view. In this case, regarding determination of whether a displayed image is a bracketed image, for example, by confirming the bracketing-capturing-number information added to the image beforehand, when the bracketing-capturing-number information represents a value other than "0", it is determined that the image is a bracketed image, and the displayed image is marked.

Also, during processing, such as printing by the printer 1500 and matching for another device, the color space information in the header region or extension can be used. In addition, for matching a color space for a device to which image data is output, images in the desired color space can be retrieved from header information of captured images, and can be collectively output. For example, in color space setting, only images in CMYK can be retrieved from header information added to each image, and can be collectively output to the printer 115 at printing time. This reduces time and simplifies printing. Similarly, images in sRGB for the monitor 113 can be retrieved and collectively output to the monitor 113 for multi-image display.

Other Embodiments

It should be noted that includes digital cameras as well as digital camcorders, digital-camera-equipped cell-phones, scanners, etc. The present invention also includes a camera connected to a personal computer in which image capturing is remotely (by wire or wirelessly) performed by sending a shutter release signal from the personal computer. In addition, a plurality of images automatically formed in response to one image-capturing instruction may be stored in a single directory or folder, and a plurality of images automatically formed in response to another image-capturing instruction may be stored in a directory or folder different from the above directory or folder. The present invention category includes one in which, by supplying the program code of software for realizing functions in accordance with the above-described embodiments to a computer (CPU or MPU) in an system or system connected to various devices, and operating the devices in accordance with a program stored in the system or system, the functions in accordance with the above-described embodiments are realized.

In this case, the program code of the software itself realizes the functions in accordance with the above-described embodiments. Therefore, the program code itself, and a means of supplying the program to the computer, for example, a recording medium storing the program code, constitute the present invention. Types of the recording medium include, for example, a flexible disk, a hard disk, an optical disk, a magneto-optical disk, a CD-ROM, a magnetic tape, a nonvolatile memory card, and a ROM.

In a case in which the computer executes supplied program code, whereby not only the functions of the above-described embodiments are realized, but also the functions of the above-described embodiments are realized in cooperation with an operating system on which the program code runs, or another application, definitely, the above program code is included in the embodiments of the present invention.

Moreover, the present invention definitely includes a case in which, after supplied program code is stored in a memory of an add-in board for the computer or an add-in unit connected to the computer, based on instructions of the program code, a CPU or the like of the add-in board or unit performs all or part of actual processing and the processing realizes the functions of the above-described embodiments.

The present invention can also be achieved by providing a storage medium storing program code for performing the above-described processes to an image sensing system or system, reading the program code, by a CPU or MPU of the image sensing system or system, from the storage medium, then executing the program.

In this case, the program code read from the storage medium realizes the functions according to the embodiments, and the storage medium storing the program code constitutes the present invention.

In addition, the storage medium, such as a floppy disk, a hard disk, an optical disk, a magneto-optical disk, CD-ROM, CD-R, a magnetic tape, a non-volatile type memory card, and ROM, and a computer network, such as LAN (local area network) or WAN (wide area network), can be used for providing the program code.

The present invention is also capable of being performed by a computer OS (operating system) or the like that performs all or part of processes in accordance with instructions of program code and attains functions according to the above-described embodiments.

Furthermore, the present invention also includes a case where, after the program code read from the storage medium is written in a function expansion card which is inserted into the image sensing system or system or in a memory provided in a function expansion unit which is connected to the image sensing system or system, a CPU or the like contained in the function expansion card or unit performs all or part of processing in accordance with instructions of the program code and realizes functions of the above-described embodiments.

In a case where the present invention is applied to the above-described storage medium, the storage medium stores program code corresponding to the flowcharts of FIGS. 3 to 8 described in the above-described embodiments.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-405976 filed on Dec. 4, 2003, which is hereby incorporated by reference herein.

What is claimed is:

1. An image capturing system comprising:
   an image-capturing instruction unit which provides an instruction to perform image capturing in response to an operation by a user;
   an image input unit which inputs image data;
   a color-space setting unit which sets information of plural different types of color spaces; and
   a storage unit which receives the image data input by the image input unit and automatically stores the input image data in a form associated with the information of the plural different types of color spaces set by the color-space setting unit in response to one image-capturing instruction from the image-capturing instruction unit,
   wherein a file name assigned to the image data includes file name characters, file number characters, and file extension characters in order, and the file name characters are changed for each of the plural different types of color spaces.

2. The image capturing system according to claim 1, further comprising an image processing unit which performs image processing on the input image data based on the information of the plural different types of color spaces set by the color-space setting unit.

3. The image capturing system according to claim 2, wherein, in response to said one image-capturing instruction from the image-capturing instruction unit by the user, the image processing unit automatically receives, as image data for one capturing by an image sensing unit, the image data input by the image input unit, and performs the image processing on said image data for one capturing by an image sensing unit for each of the plural different types of color spaces set by the color-space setting unit.

4. The image capturing system according to claim 2, wherein, in response to said one image-capturing instruction from the image-capturing instruction unit by the user, the image processing unit automatically receives, in a sequential manner, as image data for plural capturing by an image sensing unit, the image data input by the image input unit, and performs the image processing on said image data for plural capturing by an image sensing unit for each of the plural different types of color spaces set by the color-space setting unit.

5. The image capturing system according to claim 1, wherein the image data stored in the storage unit is accommodated in a directory different for each of the types of color spaces.

6. The image capturing system according to claim 1, wherein the image data automatically stored in response to said one image-capturing instruction forms a plurality of images, and the images are accommodated in a directory different from a directory in which a plurality of images are automatically stored in response to another image-capturing instruction.

7. The image capturing system according to claim 1, wherein identification information which identifies the plural different types of color spaces is added to the image data.

8. The image capturing system according to claim 7, wherein the identification information is added to a header region of the image data.

9. The image capturing system according to claim 7, wherein the identification information is a file name assigned to the image data.

10. The image capturing system according to claim 7, further comprising a display unit which displays the image data,
wherein the display unit displays the identification information added to the image data.

11. An image capturing method comprising:
initiating image capture by instruction, in response to a user input;
inputting image data;
setting information of plural different types of color spaces;
receiving the input image data; and
automatically storing the input image data in a form associated with the information of the plural different types of color spaces in response to one image-capturing instruction,
wherein a file name assigned to the image data includes file name characters, file number characters, and file extension characters in order, and the file name characters are changed for each of the plural different types of color spaces.

12. A computer-readable storage medium storing computer-executable instructions for causing a computer to perform the image capturing method according to claim 11.

13. A system for capturing images for output in different types of color spaces, the system comprising:
image-capturing instruction means for providing instructions to initiate and perform image capturing;
image input means for inputting image data of the images;
color-space setting means for setting information of plural different types of color spaces; and
storage means for receiving the image data input by the image input means,
and storing the input image data in a form corresponding with the information of the plural different types of color spaces set by the color-space setting means in response to one image-capturing instruction,
wherein a file name assigned to the image data includes file name characters, file number characters, and file extension characters in order, and the file name characters are changed for each of the plural different types of color spaces.

14. The system of claim 13 wherein the image data stored in the storage means is accommodated in a directory different for each of the types of color spaces.

15. An image processing method comprising:
a color-space setting step for setting plural different types of color spaces;
an image input step for inputting image data which is captured in response to one image-capturing instruction;
a conversion step for converting the input image data input by the image input unit to a plurality of image data, each of which has the different type of color space set by the color-space setting unit; and
a storing step for storing the plurality of image data converted in the conversion step in a storage device,
wherein a file name assigned to each of the plurality of stored image data includes file name characters, file number characters, and file extension characters in order, and the file name characters are changed for each of the plural different types of color spaces.

16. The image processing method according to claim 15, wherein the plural different types of color spaces include sRGB and AdobeRGB.

17. The image processing method according to claim 15, wherein the plural different types of color spaces include sRGB and CMYK.

18. The image processing method according to claim 15, wherein the plural different types of color spaces include sRGB and Lab.

19. The image processing method according to claim 15, wherein said conversion is performed in a digital camera.

20. The image processing method according to claim 15, wherein the file number characters of the plurality of stored image data are identical.

21. The image processing method according to claim 15, wherein the file number characters of the plurality of stored image data are different from each other.

22. The image processing method according to claim 15, further comprising a display step of displaying, on a display device, the plurality of stored image data at once, together with the file name.

23. A computer-readable storage medium storing computer-executable instructions for causing a computer to perform the image capturing method according to claim 15.

24. An image processing apparatus comprising:
a color-space setting unit which sets plural different types of color spaces;
an image input unit which inputs image data which is captured in response to one image-capturing instruction;

a conversion unit which converts the input image data input by the image input unit to a plurality of image data, each of which has the different type of color space set by the color-space setting unit; and a storage unit which stores the plurality of image data converted by the conversion unit, wherein a file name assigned to each of the plurality of stored image data includes file name characters, file number characters, and file extension characters in order, and the file name characters are changed for each of the plural different types of color spaces.

\* \* \* \* \*